Nov. 20, 1962 L. W. McNAIR ETAL 3,065,324
CONTROL SYSTEM FOR BILLET HEATERS
Filed Sept. 19, 1960 2 Sheets-Sheet 1
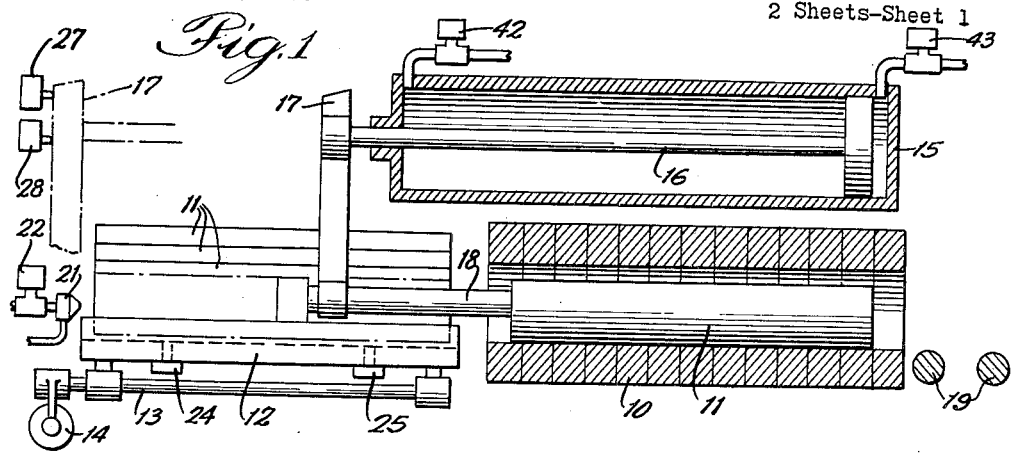
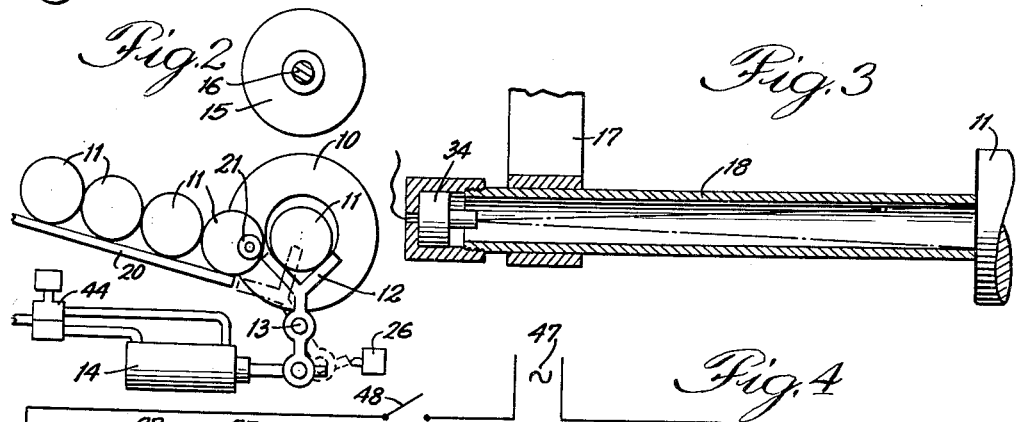
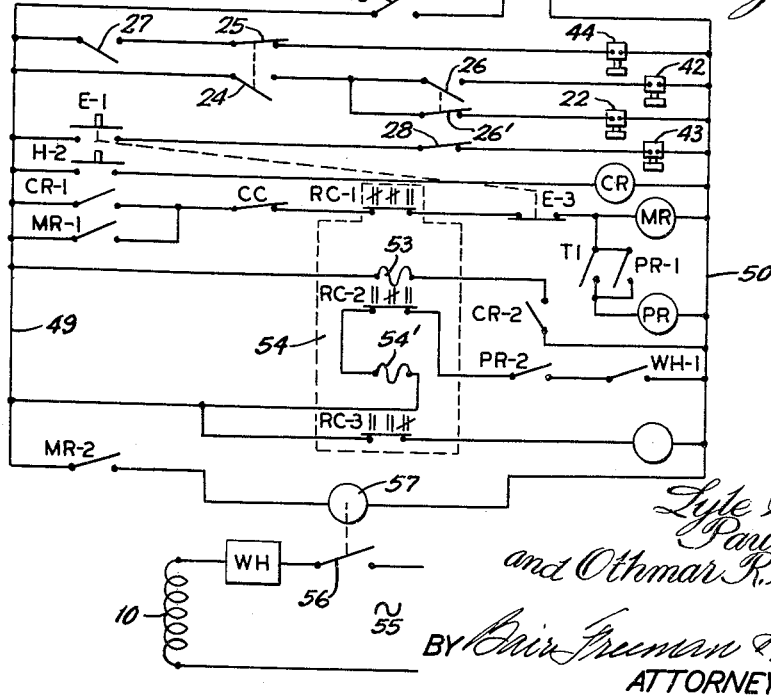
INVENTORS:
Lyle W. McNair,
Paul E. Bjork,
and Othmar R. Niczkowski,
BY Bair, Freeman & Molinare
ATTORNEYS.

Nov. 20, 1962  L. W. McNAIR ETAL  3,065,324
CONTROL SYSTEM FOR BILLET HEATERS
Filed Sept. 19, 1960  2 Sheets-Sheet 2

INVENTORS:
Lyle W. McNair,
Paul E. Bjork,
and Othmar R. Kuczkowski,
BY Bair, Freeman & Molinare
ATTORNEYS.

3,065,324
CONTROL SYSTEM FOR BILLET HEATERS
Lyle W. McNair, Florissant, Mo., and Paul E. Bjork, Broadview, and Othmar R. Wuczkowski, Chicago, Ill., assignors to Lindberg Engineering Company, Chicago, Ill., a corporation of Illinois
Filed Sept. 19, 1960, Ser. No. 57,054
9 Claims. (Cl. 219—10.69)

This invention relates to a control system for billet heaters and more particularly to apparatus for accurately sensing the temperature of a billet as it is being heated.

In the heating of billets and like articles, particularly in induction coils, one of the principal difficulties encountered has been to obtain an accurate measurement of the billet temperature. This, of course, is essential in order to insure heating of the billet to a sufficiently high temperature for subsequent working and at the same time to avoid overheating. Thermocouples have commonly been used for this purpose, but have not been satisfactory because of the difficulty of obtaining uniformly good contact with the billets and uniform properties of the metal layer between points of prod engagement. It will be appreciated that the billets are subject to corrosion and to the accumulation of foreign materials such as dirt and grease which will prevent or interfere with good thermocouple contact.

Similar difficulties have been encountered in the use of radiation measuring devices, such as radiation pyrometers, sensing infrared radiation. Non-uniform surface conditions of the billets due to the differences in the degree of corrosion and roughness of the surface results in different intensities of radiation from different billets at the same temperature so that uniform results cannot be achieved.

In this connection it is to be noted that the radiation from a body is dependent upon its temperature and the freedom with which its surface allows energy to escape. Maximum radiation will occur from a so-called black body from which radiation is proportional to the fourth power of the absolute temperature and can be considered 100%. For all surfaces not having a black body condition the rate of radiation will be less than 100% and will vary over a substantial range depending upon the surface condition.

It is the principal object of the present invention to provide a control system for billet heaters in which the temperature of a heated billet is sensed with a high degree of accuracy even on low emissivity materials and irrespective of the amount of corrosion or foreign material thereon.

According to a feature of the invention, one or both ends of each billet is uniformly coated before heating with a uniform coating of particles of sufficient size to create a black body condition. Preferably the particles are of a size 20 microns or more to produce a black body condition with respect to infrared waves in the wave length range of 0.7 to 7.0 microns. Colloid graphite is preferably used as the coating material since it not only produces a uniform black body condition, but also serves as a lubricant in further processing of the billets.

Another object is to provide a control system for billet heaters in which one end or both ends of each billet is automatically coated just prior to feeding of the billet into the heating coil.

In the preferred construction, the ends of the billet are automatically coated by spraying a liquid suspension thereon as the billet is moved into alignment with the coil in a position to be pushed into the coil.

According to another feature of the invention, the billet temperature is sensed by radiation responsive means housed in a hollow pusher rod which engages the end of the billet so that the radiation sensing means is shielded from extraneous sources of radiation, or sensed by radiation responsive means which can be located remotely and not responsive to extraneous sources of radiation.

The above and other objects and features of the invention will be more readily apparent from the following description when read in connection with the accompanying drawings, in which:

FIGURE 1 is a diagrammatic side view with parts in section of a billet heater equipped with a control system embodying the invention;

FIGURE 2 is an end elevation looking from the left in FIGURE 1 with parts omitted;

FIGURE 3 is an enlarged section through the pusher rod;

FIGURE 4 is a wiring diagram;

Figure 5:
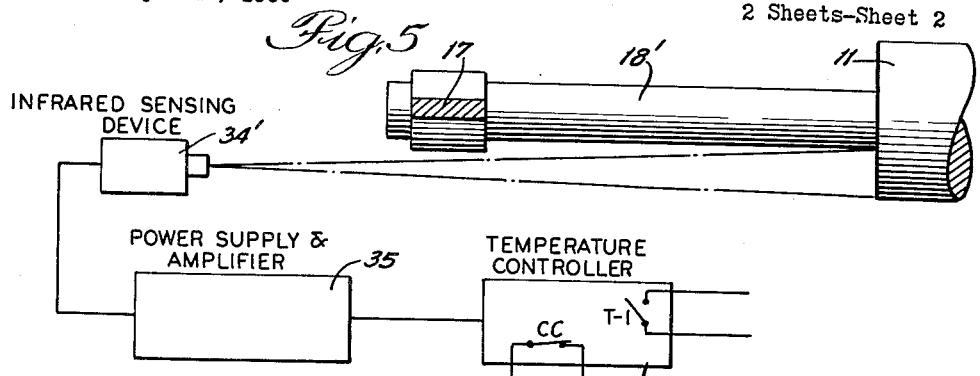
FIGURE 5 is a partial horizontal section with parts shown diagrammatically illustrating an alternative sensing arrangement.

The billet heating system, as shown, comprises a conventional induction coil 10 which is tubular in shape so that billets, as indicated at 11, may be pushed into one end of the coil to be heated thereby and may be pushed out of the other end of the coil after heating. Billets to be pushed into the coil are held in alignment therewith by a tiltable V-shaped trough 12 which is mounted on a pivot rod 13 for pivoting about an axis parallel to the coil axis or to a tilted position out of alignment with the coil in which a billet is received therein from a storage rack 20, or the like. As best seen in FIGURE 2, the storage rack 20 is adapted to hold a plurality of billets in side-by-side relationship and is tilted so that the billets tend to roll by gravity toward the trough 12 which functions as a transfer device.

The trough 12 is normally held in the vertical full line position shown in FIGURE 2 by an air cylinder 14 and is tilted counterclockwise to the dotted line position shown by the air cylinder 14 to receive a billet. Operating fluid is supplied to one end or the other of cylinder 14 through a solenoid reversing valve 44 which normally connects the right end of the cylinder 14 to the air supply and which is energized to supply air to the left end of the cylinder so that the motor will expand and tilt the trough to its billet receiving position. As seen in FIGURE 2, when the trough is tilted the lowermost billet on the rack may roll freely into it and when the trough is tilted back to the vertical it will engage the next billet in line on the rack and prevent it from rolling down further.

A billet on the trough 12 is pushed into the coil by a double acting fluid motor 15 which is shown as mounted above the coil 10 and which has an elongated piston rod 16. The piston rod 16 at its outer end carries a cross frame member 17 which supports a tubular pusher rod 18 at its lower end. When the piston rod is moved out to the dot-dash line position, partially shown in FIGURE 1, a billet may be supported on the trough 12 in alignment with the coil 10. When the piston rod is moved inward of the cylinder to the full line position shown the pusher rod 18 will engage the outer end of the billet and push it into a substantially centered position in the coil, as shown. At the same time, a previously heated billet in the coil will be pushed out onto a conveyor, partially shown at 19, which will conduct the heated billet away from the coil.

The temperature of a billet being heated in the coil is sensed by a radiation detector 34 which is mounted in the tubular pusher rod 18, as best seen in FIGURE 3, to respond to radiations from the end of the billet. Preferably the sensing device 34 is a part of a radiation pyrometer responsive to infrared radiations and containing filters to filter out visible light in the range from .4 to .7 microns to sense when the temperature of the billet has reached a predetermined desired value.

The radiations, as shown in FIGURE 5, could also be sensed by a detector 34' fixedly mounted at one side of the pusher rod 18', which could be solid in this case, and viewing a spot on the end of a billet 11 at one side of the pusher rod. Signals from the detector 34' or 34 are amplified by an amplifier 35 and supplied to a temperature controller 36 to operate it as described hereinafter.

In order to insure uniformity of sensing of the billet temperature at least the trailing end and preferably both ends of each billet are treated to produce a black body condition at least in the area viewed by the radiation detector. While this could be accomplished in various ways, as by drilling the ends of the billet, the preferred method, as specifically disclosed herein, is to coat the cord or ends of the billet with pigmented coating material before it is pushed into the heating coil. As shown, the coating material is preferably supplied by a spray nozzle 21 which is automatically controlled by a solenoid valve 22 to spray coating material onto the end of an adjacent billet each time the valve 22 is opened.

The coating material is preferably in the form of solid particles suspended in a liquid carrier and binder. It has been found that the particle size is extremely important and that the particle size should be controlled in accordance with the wave length of the radiations to be used in sensing temperature.

Figure 6:
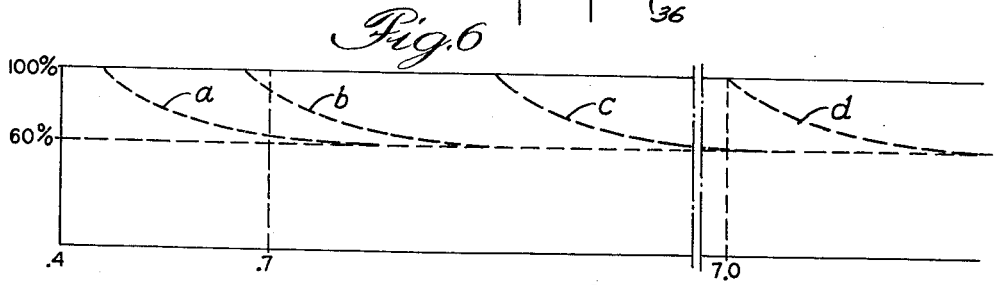
FIGURE 6 is a graph showing radiation patterns.

According to the present invention infrared radiations having a wave length in the range from 0.7 to 7.0 microns are utilized and the sensing device or radiation detector 34 is responsive to these radiations only. FIGURE 6 illustrates the effectiveness of coatings containing different particle sizes on radiations of different lengths with wave lengths plotted against emissivity. The 100% line at the top indicates a perfect black body condition and the 60% line indicates the average emissivity of an uncoated aluminum billet. The curve $a$ illustrates the effect of a coating in which the particles are of two micron size and it will be seen that at wave lengths below about .5 microns a black body condition exists while for wave lengths slightly above .7 microns the coating is ineffective. Similarly, the curves $b$, $c$ and $d$ show the effect of coatings having particle sizes of five, ten and twenty microns, respectively. It will be seen that when the particle size is as great as twenty microns a black body condition exists for all wave lengths less than 7 microns. Therefore, according to the present invention, the coating employed contains particles at least as large as twenty microns with the maximum size being limited only by mechanical considerations.

While a number of different coating materials, such as metallic paints or other pigmented coatings, could be satisfactorily employed, the preferred material is a solution of colloidal graphite which will make the ends of each billet appear as a dead black body. One suitable material for the purposes of the invention is that sold commerically as "Dag Dispersion No. 22" by Acheson Colloids Co. and consisting of a semi-colloidal graphite in an aromatic solvent containing 50% solids. The use of colloidal graphite is preferred not only because it will produce a uniform dead black body condition on the ends of the billets, but also because it functions as a lubricant in further processing of the billets. For example, in extrusion operations it has been common to use a dummy pusher rod to push the billets through the extrusion machine and to coat the end of the rod or the billet with graphite in order to reduce adhesion therebetween under the extrusion pressures. The use of colloidal graphite as a coating medium eliminates the necessity for separately applying this material to serve as a lubricant in such further processing steps.

Operation of the several parts of the unit is controlled in an automatic cycle by a series of electric switches. As shown in FIGURE 1, a switch 24 is mounted on the trough 12 to be engaged by a billet when it enters the trough and to be closed when a billet is present in the trough. A similar switch 25 is mounted on the trough, being normally closed and being open when a billet is present in the trough. The fluid motor 14, as shown in FIGURE 2, engages and closes the switch 25 when the motor is extended to tilt the trough to its billet receiving position. Switches 27 and 28 are engaged by the cross frame 17 when the piston rod 16 is extended to its billet receiving position, the switch 27 being closed by engagement with the cross frame and the switch 28 simultaneously being opened. A similar switch 29 is mounted adjacent to the cylinder 15 to be engaged and closed by the cross frame 17 when it is moved toward the cylinder to push a billet into the coil.

Supply of operating fluid to the fluid motor 15 is controlled by solenoid valves 42 and 43. When the valve 42 is open, fluid will be admitted to the cylinder to move the piston rod 16 therefrom to billet receiving position and when the valve 43 is open, fluid will be admitted to the opposite end of the cylinder to retract the piston rod and to push a billet into the coil.

The several switches and valves are connected in an automatic cyclic control circuit, as illustrated in FIGURE 4, which receive power from any suitable source 47. The circuit is initially turned on by a manually operable switch 48 which connects the lines 49 and 50 across the power source, these lines serving as the power supply for the several valves and other parts to be described.

In addition to the several switches and valves referred to above, the control circuit comprises a heat control switch H2 in circuit with a control relay CR which when energized closes normally open contacts CR-1 and CR-2. There is also provided an eject switch having one set of contacts E-1 in circuit with the valve 43 and normally open and a second set of normally closed contacts E-3 in circuit with a master relay MR which when energized closes normally open switch contacts MR-1 and MR-2. The relay MR is energized through the contacts E-3, a first counter switch RC-1 and excess temperature switch CC in the temperature controller and which opens only in response to excess temperature and the contacts CR-1 and MR-1 in parallel. The same contacts, plus an additional contact T-1 in the temperature controller, which is closed when the billet reaches a predetermined relatively low temperature on the order of 400° F., as sensed by the radiation responsive means 34, control the circuit to a pyrometer relay PR. When the pyrometer relay PR is energized, it closes normally open switches PR-1 and PR-2, the former of which completes a holding circuit parallel to the switch T-1 to maintain the relay energized. The switch CR-2 is connected in series with a clutch operating coil 53 of a reset counter, indicated by the dotted line 54, and which includes the contacts RC-1 and a second set of contacts RC-2 and a third set of contacts RC-3. The contacts RC-1, RC-2 and RC-3 are moved simultaneously to three different positions in the first of which, as indicated by the symbols above the contacts, the contacts RC-1 are closed and contacts RC-2 and RC-3 are open. In the second position, contacts RC-1 and RC-2 are closed and contacts RC-3 are open. In the third position, contacts RC-1 and RC-2 are open and contacts RC-3 are closed. Contacts RC-2 are connected in circuit with a counter coil 54' and with the pyrometer contacts PR-2 and an impulse counting switch WH-1. When the contacts RC-2 and PR-2 are closed, the counter coil will be energized each time the impulse switch WH-1 is closed and after a predetermined number of counts the counter will operate to discontinue the supply of heating current to the coil 10 by de-energizing a relay 57 which controls the supply of current to the coil.

As shown, the relay 57 controls a main switch 56 which supplies heating current from a source 55 to the coil 10 through a watt hour meter WH. The watt hour meter will periodically close the impulse switch WH-1 each time a predetermined amount of power has flowed therethrough to the coil 10. In this way, the watt hour meter and the impulse switch measure the amount of power supplied to the coil and the counter counts or integrates the amount of power supplied after the switch RC-2 is closed so that a predetermined amount of power may be supplied to the coil for billet heating purposes. In an operating cycle, assuming that the trough is tilted to the dotted line position shown in FIGURE 2 to receive a billet, the switches 25 and 27 will be closed to energize the valve 44 to supply operating fluid to the motor 14 to tilt the trough. When a billet rolls from the rack 20 into the trough it will engage the switches 24 and 25 to close the switch 24 and open the switch 25. Opening of the switch 25 will de-energize the valve 44 allowing the trough 12 to move back to a position in which the billet is aligned with the coil 10. As soon as the switch 24 is closed, the valve 22 will be energized through the switch 24 and through normally closed contacts 26' of the switch 26. At this time, coating material will be sprayed through the nozzle 21 onto the end of the billet which is in the trough 12 to coat it. When the trough 12 starts to move back into alignment with the inductor coil, the switch 26 will be operated to close the upper contacts 26 thereof, as seen in FIGURE 4, and to open the lower contacts 26' to interrupt the spraying operation. The upper contacts 26 will complete a circuit through the switch 24 to the valve 42 to open it and admit fluid to the outer end of the cylinder 15 to retract the piston rod 16. This will move the pusher rod 18 into engagement with the outer coated end of the billet in the trough and move the billet into a centered position in the coil.

As the frame member 17 moves away from the switches 27 and 28 the switch 27 will open to prevent energization of the valve 44 and closing of the switch 28 will prepare the circuit for energization of the valve 43.

The system is now in condition for application of heat to the billet but will remain in this condition until the heat control switch H-2 is closed. Temporary closing of the switch H-2 energizes the relay CR which in turn closes the contacts CR-1 and CR-2. Closing of the contact CR-2 will energize the clutch 53 and will reset the counter switches to position 1 in which switch RC-1 is closed and RC-2 and RC-3 are open. Closing of the contacts RC-1 will energize the relay MR through the switches CC and CR-1 and it will be maintained energized through the holding contacts MR-1. At the same time contacts MR-2 will be closed to energize the relay 57 thereby to close the main switch 56 and to supply heating current to the coil 10.

When the heat switch H-2 is released it will open to de-energize the relay CR upon which the contacts CR-1 and CR-2 will open. Opening of the contacts CR-2 de-energize the clutch 53 which causes the counter contacts to move to their second position in which contacts RC-1 and RC-2 are closed and contacts RC-3 are open.

The circuit will remain in this condition until the billet has been brought up to the desired initial temperature at which time the sensing device 34 will sense the desired temperature and close the contacts T-1 to energize the relay PR. When the relay PR is energized, it closes the contacts PR-1 and PR-2. With the contacts RC-2 and PR-2 both closed, the counter coil 54' will be energized each time the watt hour meter impulsing switch WH-1 closes to advance the counter one step. The counter in this way will count the impulses and will measure the power supplied to the induction coil 10.

After a predetermined number of impulses as adjusted by setting of the counter, it will count out and will move its switches to the third position in which contacts RC-1 and RC-2 are open and contacts RC-3 are closed. Opening of contacts RC-1 will de-energize the relay MR to open the contacts MR-2 and de-energize the relay 57 so that the switch 56 will open to interrupt the supply of heating current to the coil 10. At the same time, the relay PR will be de-energized to open the contacts PR-1 and PR-2 to interrupt the circuit through the counter coil 54. At this time, the billet has been heated to the desired final temperature and the parts will remain in their existing condition until the operator is ready to discharge the billet from the coil and to supply a new billet thereto.

For this purpose, the operator temporarily closes the contacts E-1 to energize the valve 43 through the closed contacts 28 thereby to supply operating fluid to the motor 15 to move the piston rod to its extended position ready to receive a further billet. When the piston rod reaches its full retracted position, it will engage and close the switch 27 to energize the valve 44 thereby to tilt the trough 12 to its billet receiving position and the cycle will repeat, as described above. For a more complete description of the control circuit and the complete cycle of operations, reference may be had to the co-pending application of Othmar R. Wuczkowski, Serial No. 13,267, filed March 7, 1960.

Also, although the temperature sensing device 34 herein has been described as initiating the operation of a watt hour measuring device for measuring the quantity of heat supplied to a billet after the billet reaches a predetermined initial temperature, it will be understood that this same sensing device could equally well be utilized to terminate a heating operation after the billet has achieved the desired final temperature.

Figure 7:
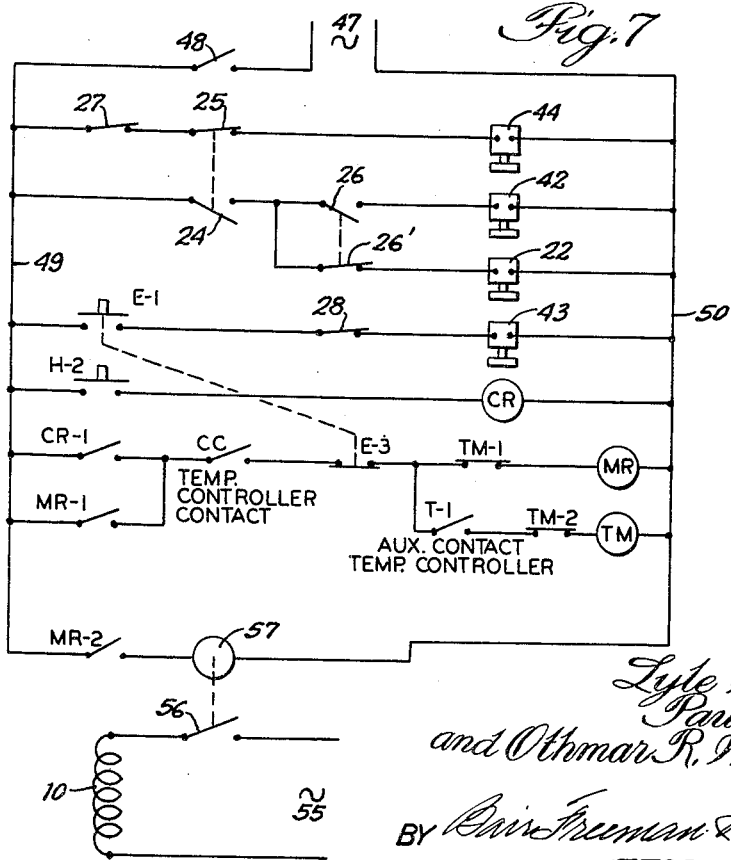
FIGURE 7 is an alternative wiring diagram.

For an operation of the last mentioned type, a circuit as shown in FIGURE 7 may be employed, parts therein corresponding to like parts in FIGURE 4 being indicated by the same reference characters. In this circuit most of the parts are the same as in the circuit of FIGURE 4 but the reset counter and its switches are omitted and replaced by a simple timer TM which opens normally closed contacts TM-1 and TM-2 after a predetermined interval of operation. The timer switch TM-1 is connected in circuit with the master relay MR and the switch TM-2 is in circuit with the timer TM.

In the use of this construction the temperature controller is adjusted to open the switch CC when the billet reaches the desired temperature and constitutes the primary control. The timer TM is adjusted to open the switches TM-1 and TM-2 after a time interval normally more than sufficient to raise the billet temperature from the starting temperature at which the switch T-1 is closed to the desired final temperature at which the switch CC is opened and constitutes a safety control to prevent overheating. Other than for these differences the operation is essentially the same as described above in connection with FIGURE 4.

While several embodiments of the invention have been shown and described herein, it will be understood that these are illustrative only and are not to be taken as a definition of the scope of the invention, reference being had for this purpose to the appended claims.

What is claimed is:

1. A control system for a billet heater having an open ended coil to receive and heat a billet comprising means to feed a billet into the coil, radiation sensing means to sense radiations within a predetermined range of wave lengths radiating from one end of the billet, means to treat said one end of the billet to produce thereon a black body condition within said predetermined range of wave lengths before the billet is fed into the coil and control means for the last named means operable in timed relationship with the feed means.

2. The control system of claim 1 in which the feed means includes a transfer device to move the billet into alignment with the coil and the treating means is operated in timed relation with the transfer device to treat the end of the billet while it is on the transfer device and before it is moved by the transfer device into alignment with the coil.

3. A control system for a billet heater having an open ended coil to receive and heat a billet comprising supply means to position a billet in alignment with the open end of the coil, a feeder to push the billet lengthwise into the coil, radiation sensing means to sense radiation from one end of the billet, and coating means operating in timed relation with the supply means and the feeder to coat said one end of the billet with a pigmented coating while the billet is supported by the supply means and before the billet is pushed into the coil.

4. The apparatus of claim 3 in which the feeder includes a tubular rod engageable with said one end of the billet to push it into the coil and the radiation sensing means is enclosed in the rod.

5. The apparatus of claim 3 in which the coating means is a pressure spray to spray said one end of the billet as it is moved into said aligned position by the supply means.

6. A control system for a billet heater having an open ended coil to receive and heat a billet comprising a sloping storage rack on which a plurality of billets may rest to move by gravity to the lower end thereof, a transfer device to receive a single billet from the lower end of the rack and move it to a position in alignment with the coil, pusher means to push a billet into the coil, radiation sensing means at one end of the coil to sense radiation from one end of the the billet, and coating means adjacent to the transfer device to coat said one end of the billet with a pigmented coating as it is moved by the transfer device from the lower end of the rack to said aligned position.

7. The system of claim 6 in which the coating means is a pressure spray and control means are provided for the pressure spray operating in timed relation to movement of the transfer device.

8. The system of claim 7 in which the control means includes a switch operated by movement of a billet from the rack into the transfer device.

9. A control system for a billet heater having an open ended coil to receive and heat a billet comprising a sloping storage rack on which a plurality of billets may rest to move by gravity to the lower end thereof, a transfer device to receive a single billet from the lower end of the rack and move it to a position in alignment with the coil, pusher means to push a billet on the transfer device into the coil, radiation sensing means at one end of the coil to sense radiation from one end of the billet, the pusher means including a tubular rod engageable with said one end of the billet and in which the radiation sensing means is housed, and coating means adjacent to the transfer means operating in timed relationship with the transfer means to coat said one end of the billet with a pigmented coating when it moves from the rack into the transfer means.

References Cited in the file of this patent
UNITED STATES PATENTS

| | | |
|---|---|---|
| 1,910,549 | Junker | May 23, 1933 |
| 2,404,147 | Strickland | July 16, 1946 |
| 2,604,577 | Strickland et al. | July 22, 1952 |
| 2,676,234 | Lackner et al. | Apr. 20, 1954 |
| 2,858,405 | Kimbrough et al. | Oct. 28, 1958 |
| 2,872,173 | Munker | Feb. 3, 1959 |